United States Patent
Ueno et al.

[19]

[11] Patent Number: 5,806,990
[45] Date of Patent: Sep. 15, 1998

[54] PRESSED CAGE FOR A BALL BEARING

[75] Inventors: Hiroshi Ueno, Tondabayashi; Hideki Fujiwara, Kashiwara; Haruo Kimura; Kazuhisa Kajiwara, both of Yao, all of Japan

[73] Assignee: Koyo Seiko Co., Ltd., Chuo-ku, Japan

[21] Appl. No.: 866,156

[22] Filed: May 30, 1997

[30] Foreign Application Priority Data

May 31, 1996 [JP] Japan .................................. 8-160562

[51] Int. Cl.⁶ .................................................. F16C 33/38
[52] U.S. Cl. .......................... 384/530; 384/470; 384/533
[58] Field of Search .................................. 384/523, 528, 384/530, 533, 470

[56] References Cited

U.S. PATENT DOCUMENTS

| | | | |
|---|---|---|---|
| 1,494,012 | 5/1924 | Parsons | 384/530 |
| 4,215,906 | 8/1980 | Speicher . | |
| 4,958,946 | 9/1990 | Voll | 384/523 |
| 5,044,783 | 9/1991 | Willner | 384/523 |

FOREIGN PATENT DOCUMENTS

| | | |
|---|---|---|
| 2607563 | 6/1988 | France . |
| 239 026 | 9/1986 | Germany . |
| 3901250 | 7/1990 | Germany . |
| 3939438 | 6/1991 | Germany . |
| 40-14764 | 7/1940 | Japan . |
| 53-42681 | 10/1978 | Japan . |
| 3-172613 | 7/1991 | Japan . |
| 1348629 | 3/1974 | United Kingdom ................... 384/533 |

*Primary Examiner*—Thomas R. Hannon
*Attorney, Agent, or Firm*—Reid & Priest LLP

[57] ABSTRACT

A pressed cage for a ball bearing is particularly suited for use in severe lubrication conditions. The pressed cage arrangement reduces seizure, holds lubricant for long periods, and thus prolongs the life of the bearing. In the pressed cage arrangement, two annular holding plates include ball holders and flat portions that alternate at regular intervals. The holding plates have a first recess (that may be spherical or semi-elliptic) that has a radius of curvature larger than the ball's radius of curvature. A second, preferably spherical, recess, with a radius of curvature smaller than that of the ball, is formed in the first recess. The ball rotates, being supported only on the boundaries between the first and second recesses, thereby reducing seizure. Spaces formed in the second recess, and spaces between the front portion of the ball and the junction between the holding plates, function as lubricant sumps.

6 Claims, 4 Drawing Sheets

PRESSED CAGE FOR A BALL BEARING

BACKGROUND OF THE INVENTION

The invention relates to a pressed cage for a ball bearing, and particularly to a pressed cage for a ball bearing which is to be used in an environment of severe lubrication conditions, such as a crankshaft of a two-cycle engine, and which has a structure wherein seizure hardly occurs.

In a pressed cage for a ball bearing, two annular holding plates in which ball holders projected in the axial direction are formed at regular intervals in the circumferential direction are opposingly joined to each other so as to form pockets wherein balls are to be respectively disposed. The inner face of each pocket of such a pressed cage is usually formed so as to have a radius of curvature which is larger by several percent than that of a ball to be used, and holds the ball.

A pressed cage 21 of the prior art is produced in the following manner. As shown in a perspective view of FIG. 4, two annular holding plates 22 in which ball holders 23 are formed at regular intervals in the circumferential direction are opposed to each other so that respective pairs of the ball holders 23 form pockets 26, and flat portions (joint portions) 24 are joined to each other and then fixed by rivets 7. The pressed cage 21 in which balls are disposed in the pockets 26 is placed in an annular space which is formed between inner and outer races (not shown).

Conventional proposed pressed cages for a ball bearing include: a cage for a ball bearing in which, in order to prevent vibration and noise from being generated, ball holders for forming pockets are formed into a spheroidal shape having the minor axis elongating in a radial direction of the cage (Japanese Patent Publication (Kokoku) No. SHO40-14764); a cage for a ball bearing in which, in order to ensure smooth rotation of balls, two annular holding plates for forming ball holders are assembled so as to be relatively slightly moved in parallel (Japanese Utility Model Publication (Kokoku) No. SHO53-42681); and a pressed cage 31 for a ball bearing which has pockets 36 wherein, as shown in FIG. 7, cylindrical ranges 34 are partly formed on ball holders 33 that are projected in the axial direction (Japanese Patent Publication (Kokai) No. HEI3-172613).

FIG. 5(A) is a section view of the prior art pressed cage 21 for a ball bearing and taken along the pitch circle of the bearing. In the ball bearing, when the raceway (the inner race or the outer race) relatively turns, also the ball 5 and the cage 21 simultaneously turn (revolve). At this time, the ball 5 turns (revolves and rotates) while the front side in the turning direction (traveling direction) contacts with the inner wall face of the pocket 26 of the pressed cage 21. In other words, when the pressed cage 21 revolves, the ball 5 contacts with the inner wall face of the pocket 26 of the pressed cage 21 in the traveling direction while rotating about the axis Z. When seen in the direction of the arrows A of FIG. 5(A), contact portions 26a and 26b where the ball 5 contacts with the inner wall face have a shape as shown in FIG. 5(B).

In the case where the ball 5 contacts with the inner wall face of the pocket 26 and rotates about the axis Z as described above, when the angular velocity of the rotation is indicated by ω (constant) and the radius (vertical distance) of an arbitrary surface portion of the ball 5 from the axis Z is indicated by r as shown in FIG. 6, the peripheral velocity v of the surface portion of the ball is v=ω·r. Therefore, the ball 5 contacts with the inner face of the pocket of the pressed cage 21 in the vicinity of a position where the radius of rotation is maximum. In other words, the ball 5 contacts with the inner wall face of the pocket in the vicinity of either of positions P where the maximum peripheral velocity of rotation is attained, thereby causing the problem of seizure to easily arise.

In the pressed cage 31 shown in FIG. 7, the ball cannot be guided in a radial direction. In other words, such a cage which holds balls disposed between inner and outer races can freely move in a radial direction. During the turning operation, the cage vigorously conducts the so-called precession. Consequently, there arise problems in that abnormal vibration or abnormal wear (seizure) easily occurs, and that the turning operation at a high speed tends not to be stabilized.

SUMMARY OF THE INVENTION

The invention has been conducted in view of the above-discussed problems. It is an object of the invention to provide a pressed cage for a ball bearing in which seizure between a ball and the cage hardly occurs, a lubricant can be held for a long period, and the life period of the bearing can be prolonged.

In order to solve the problem, the invention provides a pressed cage for a ball bearing having configuration (1) having two annular holding plates in which ball holders projected in an axial direction and flat portions are formed at regular intervals in a circumferential direction, the annular holding plates being assembled with each other so that the ball holders are correspondingly opposed to each other, thereby forming pockets for respectively holding balls, wherein each of the ball holders formed in the annular holding plates is formed by a first spherical recess having a radius of curvature which is larger than the ball, and a second spherical recess having a radius of curvature which is smaller than the radius of curvature of the first spherical recess is formed in a bottom portion of the first spherical recess, thereby making the ball contact with a boundary between the first and second spherical recesses.

The invention provides a pressed cage for a ball bearing having configuration (2) in which the first spherical recess of configuration (1) is formed by front and rear spherical recesses continuous with the flat portions, a center of curvature of each of the front and rear spherical recesses is slightly shifted to the flat portion from a center of the pocket in which the ball is to be disposed, and on a circumferential line passing through the center of the pocket, and the second spherical recess is formed in a bottom portion of the first spherical recess where the front and rear spherical recesses are continuous with each other, thereby making the ball contact with the boundary between the first and second spherical recesses.

The invention provides a pressed cage for a ball bearing having configuration (3) in which a section of the first spherical recess of configuration (1) or (2) and taken along a pitch circle has a semielliptic shape which has a minor axis elongating in the axial direction and a major axis elongating in a circumferential direction.

The invention provides a pressed cage for a ball bearing having configuration (4) in which a center of curvature of the second spherical recess of any one of configurations (1) to (3) is slightly shifted to the bottom portion of the first spherical recess from a center of the pocket in which the ball is to be disposed, and on a line elongating in the axial direction and passing through the center of the pocket.

DETAILED DESCRIPTION OF THE PREFERRED EMBODIMENTS

Hereinafter, specific embodiments of the invention will be described with reference to the accompanying drawings.

Figure 1:
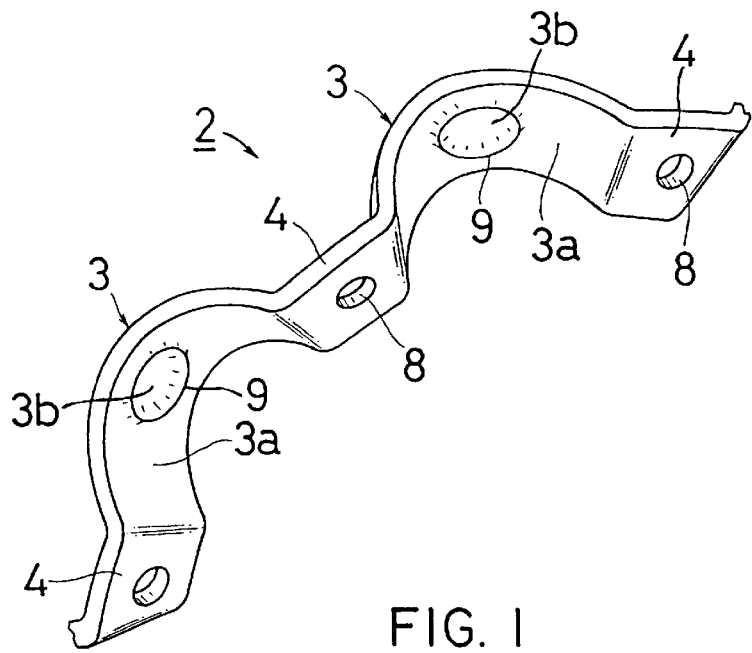
FIG. 1 is a perspective view of one of annular holding plates constituting the pressed cage for a ball bearing of the invention.
Figure 2:
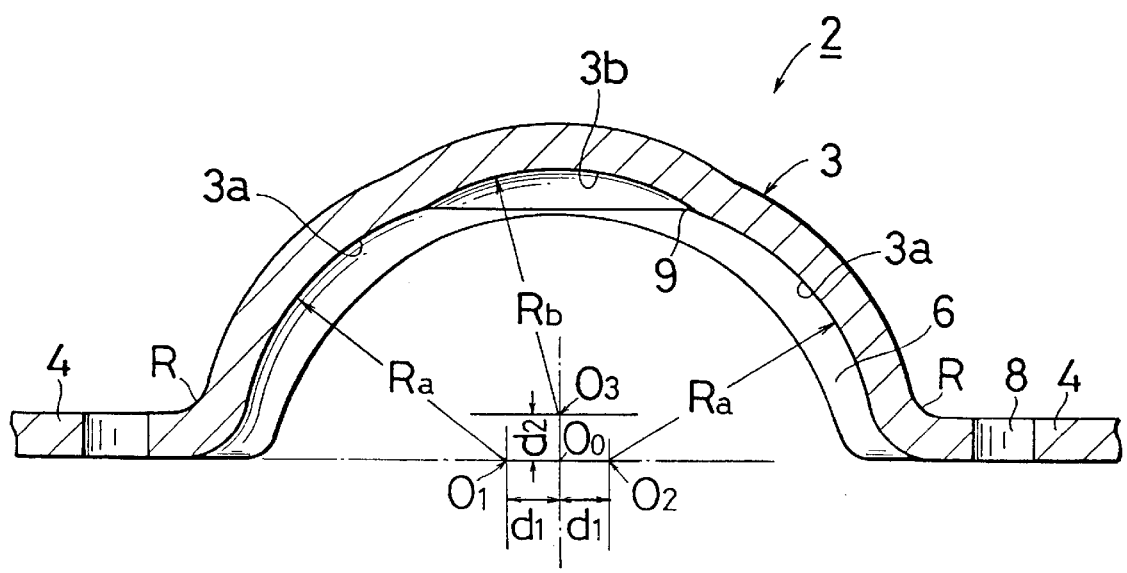
FIG. 2 is a center section view of the annular holding plate constituting the pressed cage for a ball bearing of the invention, and taken along the circumferential direction.
Figure 3:
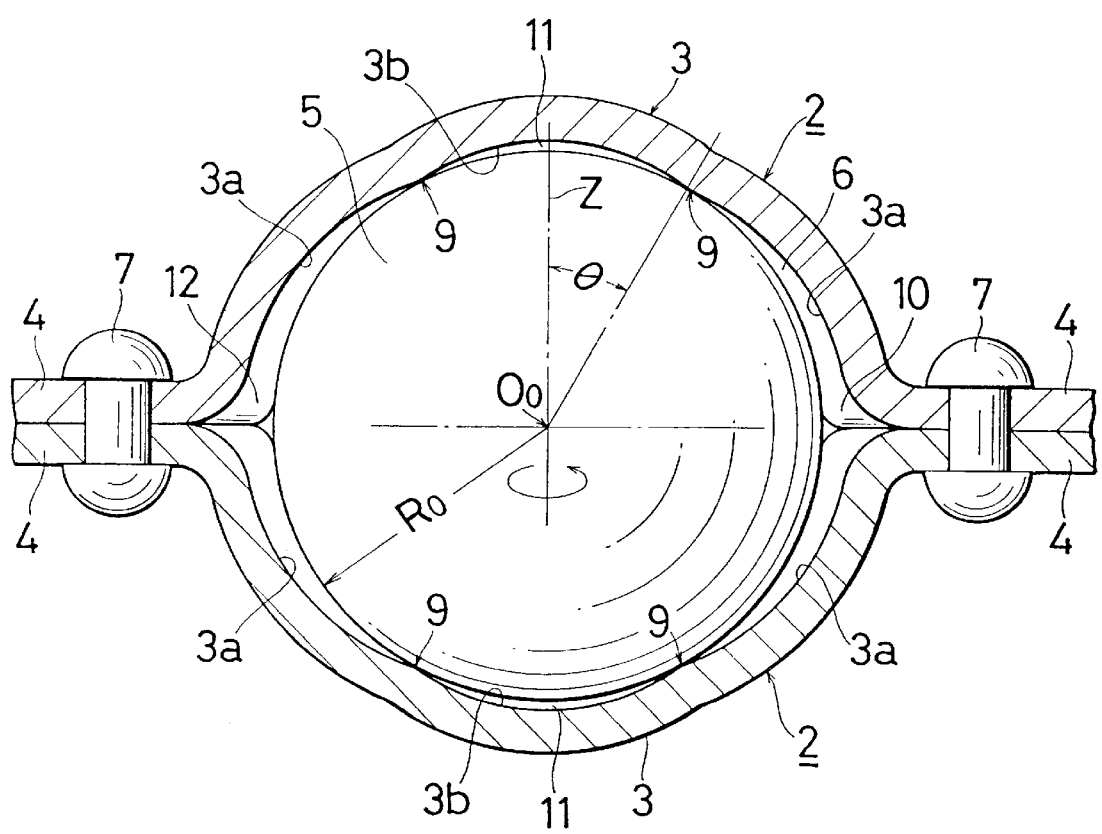
FIG. 3 is a section view showing a state in which a ball is disposed in a pocket of the pressed cage for a ball bearing of the invention, and taken along the center circumferential direction.
Figure 4:
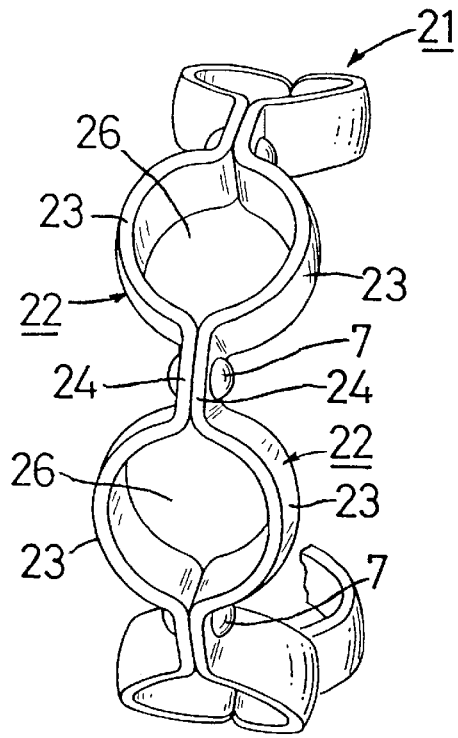
FIG. 4 is a perspective view of a prior art pressed cage for a ball bearing.
Figure 5A:
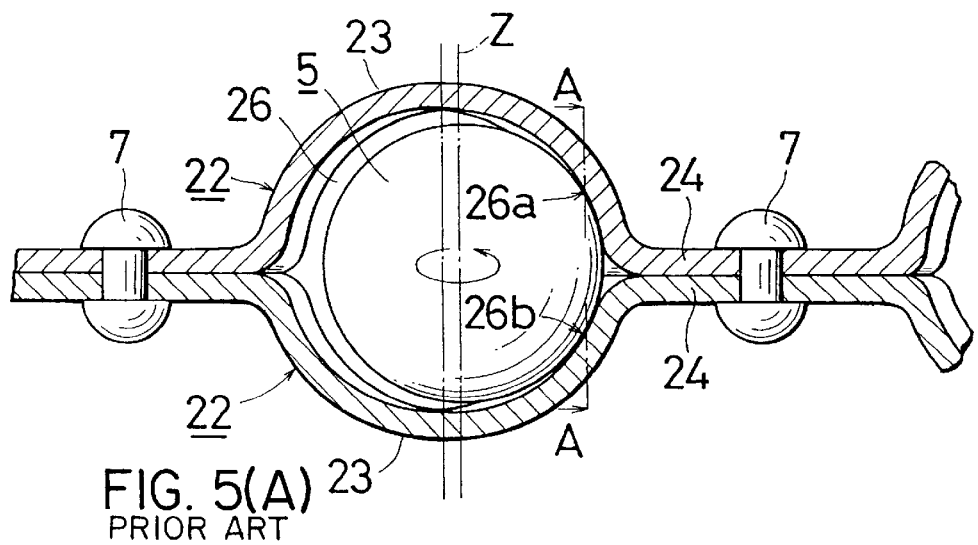
FIG. 5(A) is a section view of a prior art pressed cage for a ball bearing and taken along the center circumferential direction.
Figure 5B:
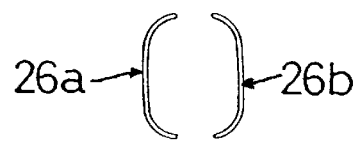
FIG. 5(B) is a view as seen in the direction of the arrows A of FIG. 5(A) and showing portions where a ball contacts with the cage.
Figure 6:
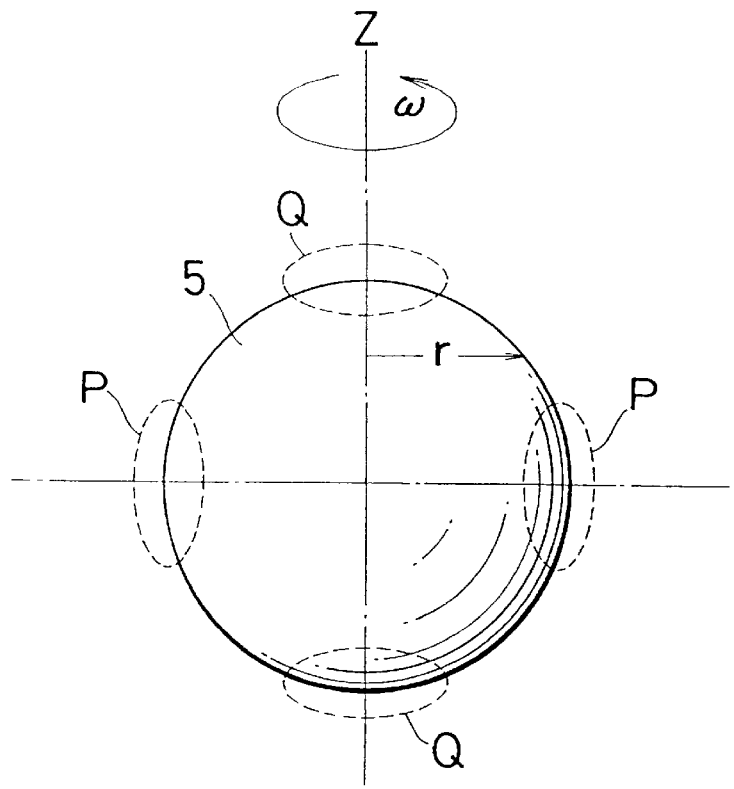
FIG. 6 is a view showing a rotation state of a ball disposed in a pocket of a pressed cage for a ball bearing.
Figure 7:
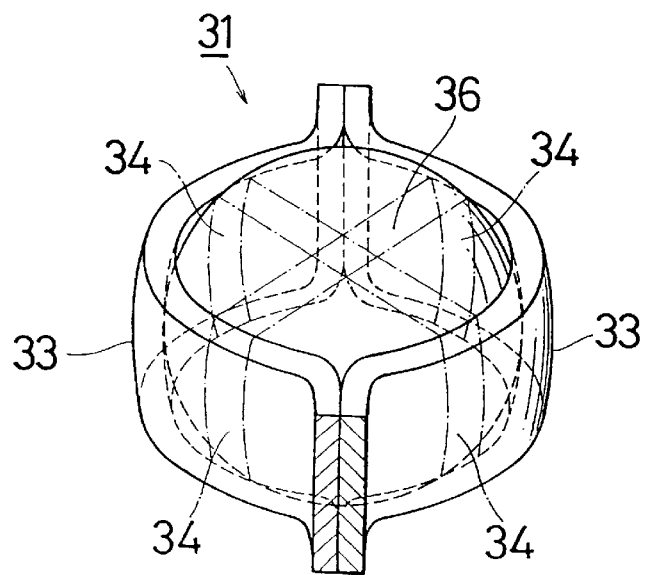
FIG. 7 is a partial perspective view of a prior art pressed cage for a ball bearing.

FIG. 1 is a perspective view of one of annular holding plates constituting the pressed cage for a ball bearing of the invention, FIG. 2 is a center section view of the annular holding plate and taken along the circumferential direction, and FIG. 3 is a section view showing a state in which a ball is disposed in a pocket of the pressed cage for a ball bearing of the invention, and taken along the center circumferential direction.

In each of the annular holding plates 2 constituting the pressed cage 1, ball holders 3 projected in the axial direction, and flat portions 4 are formed so as to be formed at regular intervals in the circumferential direction. In each of the ball holders 3, a first spherical recess 3a is formed. A second spherical recess 3b which is smaller is formed in the first spherical recess 3a. The first and second spherical recesses 3a and 3b constitute a pocket 6 in which a ball 5 is to be disposed.

The first spherical recess 3a formed in the ball holder 3 has two centers of curvature. One of the centers is at a position $O_1$ which is slightly shifted by $d_1$ from the center $O_0$ of the pocket 6 toward the rear side in the circumferential direction (for the sake of convenience of description, one side is referred to as the rear side and the other side as the front side), and the other center is at a position $O_2$ which is slightly shifted by $d_1$ from the center $O_0$ of the pocket 6 toward the front side in the circumferential direction. The radius of curvature $R_a$ of the first spherical recess 3a may be equal to or slightly larger than the radius of curvature $R_0$ of the ball 5, or alternatively may be slightly smaller than the radius of curvature $R_0$. The portions of the annular holding plate 2 ranging from the first spherical recess 3a to the corresponding flat portions 4 are processed so as to have a smooth round shape.

As described above, the first spherical recess 3a is formed by the two or front and rear spherical recesses. As required, the first spherical recess may be formed by a single spherical recess. In this case, in FIG. 2, the center of curvature is positioned so as to be slightly downward shifted in the axial direction passing through the center of curvature $O_0$ of the pocket 6, and the radius of curvature $R_a$ is larger than the radius of curvature $R_0$ of the ball 5.

As shown in FIG. 2, the center of curvature of the smaller second spherical recess 3b which is formed in the bottom portion of the first spherical recess 3a formed in the annular holding plate 2 is at a position $O_3$ which is shifted by $d_2$ toward the first spherical recess 3a from the axis passing through the center $O_0$ of the pocket 6 in which the ball 5 is to be disposed. The inner radius of curvature $R_b$ of the spherical recess 3b is slightly smaller than the radius of curvature of the ball 5.

In the above, the shapes of the first and second spherical recesses 3a and 3b formed in one of the annular holding plates 2 have been described. The first spherical recess of the other annular holding plate which is to be joined with the one annular holding plate 2, and the second spherical recess in the bottom portion of the first spherical recess are formed in the strictly same manner as those of the above-described recesses.

The first spherical recess 3a of the annular holding plate 2, the second spherical recess 3b formed in the bottom portion of the first spherical recess 3a, and the flat portions 4 are formed by a pressing work. Therefore, the annular holding plate 2 can be easily produced.

The pressed cage 1 for a ball bearing of the invention may be produced in the following manner. A pair of the annular holding plates 2 which are configured as described above are opposed to each other and then the corresponding flat portions 4 are joined to each other, and rivets 7 are inserted into holes 8 which are opened in the flat portions and then collapsed to be fixed to the portions. In an actual process, after the ball 5 is placed in the pocket 6 formed by the right and left ball holders 3, rivets 7 are inserted into holes 8 which are opened in the flat portions 4 and then collapsed to be fixed to the portions.

FIG. 3 is a section view showing a state in which the ball 5 is disposed in the pocket 6 of the thus configured pressed cage 1, and taken along the circumferential direction of the center pitch circle. The pressed cage 1 is formed by joining (coupling) the flat portions 4 of the annular holding plates 2 to each other in each of which the second spherical recess 3b is further formed in the first spherical recess 3a formed at regular intervals in the circumferential direction.

As seen from the figure, the ball 5 disposed in the pocket 6 of the pressed cage 1 contacts with and is supported by boundaries 9 between the first spherical recess 3a of the ball holder 3 formed in the annular holding plate 2, and the second spherical recess 3b formed in the bottom portion of the first spherical recess 3a.

When the ball 5 contacts with and is supported by the boundary 9 between the first spherical recess 3a and the second spherical recess 3b as described above, the angle θ formed by the boundary 9 and the axis Z is substantially small as shown in FIG. 3. In other words, when the raceway of a ball bearing in which the pressed cage 1 is used turns and the ball 5 rotates, the ball 5 contacts with the inner peripheral face of the pocket 6 of the pressed cage 1, not in the vicinity of positions P where the peripheral velocity of the rotating ball 5 is maximum, but in the vicinity of positions Q where the peripheral velocity of the rotating ball is minimum. As a result, the ball 5 contacts with the inner peripheral face of the pocket 6 of the cage 1 at positions where the rotation velocity is low, and hence seizure hardly occurs.

As apparent also from FIG. 3, the front portion of the pocket 6 of the pressed cage 1 in the traveling direction during the turning operation, i.e., the vicinity of the portion where the annular holding plates 2 are joined to each other does not contact with the ball 5, and a constant space 10 is formed therein. The space 10 functions as "a lubricant sump." Furthermore, a space 11 is formed between the ball 5 and the smaller second spherical recess 3b which is formed in the first spherical recess 3a formed in the annular holding plate 2. Consequently, also the space 11 functions as "a lubricant sump." In the pressed cage 1 configured by the opposed annular holding plates 2, therefore, the state of holding the lubricant is largely improved and the seizure resistance property is greatly enhanced.

Another embodiment of the pressed cage 1 for a ball bearing of the invention will be described.

In a section of the annular holding plate 2 taken along the circumference of a pitch circle (the same state as that of FIG. 2), the first spherical recess 3a of the ball holder 3 formed in the annular holding plate 2 may have a semielliptic section shape which has a minor axis elongating in the axial direction and a major axis elongating in the circumferential direction. In the inner portion (bottom portion) of the first spherical recess 3a, the second spherical recess 3b may be formed which has a radius of curvature which is slightly smaller than the radius of the ball 5, and the center of curvature of which is located at a position shifted by $d_2$ in the axial direction from the center $O_0$ of the pocket 6 in which the ball 5 is to be disposed.

As described above in detail, a prior art cage has a problem in that a ball contacts with the inner peripheral face at a position where the rotation velocity of the ball is maximum and hence seizure easily occurs. According to the pressed cage for a ball bearing of the invention, a ball contacts with the inner peripheral face at a position where the rotation velocity of the ball is minimum and hence seizure hardly occurs. Furthermore, the second spherical recess 3b which is formed in the first spherical recess 3a formed in the annular holding plate 2 constituting the cage, and the space 10 formed between the front portion of the pocket 6 of the cage and the ball 5 function as lubricant sumps. Therefore, the state of holding the lubricant is largely improved and the seizure resistance property is greatly enhanced, whereby the life period of the bearing can be prolonged.

What is claimed is:

1. A pressed cage for a ball bearing, comprising:

two annular holding plates in which ball holders project in an axial direction and flat portions are formed at regular intervals in a circumferential direction, the two annular holding plates being assembled so that the ball holders are opposite each other to thereby form pockets for holding respective balls, wherein each of the ball holders includes:

1) a first spherical recess having a first radius of curvature that is larger than a radius of curvature of the ball; and 2) a second spherical recess, formed in a bottom portion of the first spherical recess, and having a second radius of curvature that is smaller than the radius of curvature of the ball, thereby making the ball contact only a boundary between the first and second spherical recesses and making the ball not contact either of the first or second spherical recesses.

2. The pressed cage of claim 1, wherein:

the first spherical recess includes front and rear spherical recesses that are continuous with the flat portions and having respective centers of curvature that are slightly shifted, away from a center of the pocket, toward the flat portions, on a circumferential line passing through a center of the pocket; and the second spherical recess is formed where the front and rear spherical recesses are continuous with each other, thereby making the ball contact only a boundary between the first and second spherical recesses and making the ball not contact either of the first or second spherical recesses.

3. The pressed cage of claim 1, wherein:

the second spherical recess has a center of curvature that is slightly shifted, away from a center of the pocket, toward the bottom portion of the first spherical recess, along a line extending axially through the center of the pocket.

4. The pressed cage of claim 1, wherein:

the first spherical recess includes front and rear spherical recesses that are continuous with the flat portions and having respective centers of curvature that are slightly shifted, away from a center of the pocket, toward the flat portions, on a circumferential line passing through a center of the pocket;

the second spherical recess is formed where the front and rear spherical recesses are continuous with each other, thereby making the ball contact only a boundary between the first and second spherical recesses and making the ball not contact either of the first or second spherical recesses; and the second spherical recess has a center of curvature that is slightly shifted, away from a center of the pocket, toward the bottom portion of the first spherical recess, along a line extending axially through the center of the pocket.

5. A pressed cage for a ball bearing, comprising:

two annular holding plates in which ball holders project in an axial direction and flat portions are formed at regular intervals in a circumferential direction, the two annular holding plates being assembled so that the ball holders are opposite each other to thereby form pockets for holding respective balls, wherein each of the ball holders includes:

1) a first recess that has a semi-elliptic shape with a minor axis extending axially and a major axis extending circumferentially; and 2) a second recess that has a spherical shape, formed in a bottom portion of the first recess, and having a radius of curvature that is smaller than a radius of curvature of the ball, thereby making the ball contact only a boundary between the first and second recesses and making the ball not contact either of the first or second recesses.

6. The pressed cage of claim 5, wherein:

the second recess has a center of curvature that is slightly shifted, away from a center of the pocket, toward the bottom portion of the first recess, along a line extending axially through the center of the pocket.

* * * * *